US012606323B2

(12) United States Patent
Rakshit et al.

(10) Patent No.: US 12,606,323 B2
(45) Date of Patent: *Apr. 21, 2026

(54) AUTOMATED DETERMINATION OF COST OWNERSHIP OF SPACE DEBRIS

(71) Applicant: International Business Machines Corporation, Armonk, NY (US)

(72) Inventors: Sarbajit K. Rakshit, Kolkata (IN); Sathya Santhar, Ramapuram (IN); Sridevi Kannan, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/062,885

(22) Filed: Feb. 25, 2025

(65) Prior Publication Data

US 2025/0236419 A1     Jul. 24, 2025

Related U.S. Application Data

(63) Continuation of application No. 18/371,185, filed on Sep. 21, 2023, now Pat. No. 12,263,966.

(51) Int. Cl.
| | |
|---|---|
| B64G 1/68 | (2006.01) |
| B64G 3/00 | (2006.01) |
| G06V 20/13 | (2022.01) |

(52) U.S. Cl.
CPC ................. B64G 1/68 (2013.01); B64G 3/00 (2013.01); G06V 20/13 (2022.01)

(58) Field of Classification Search
CPC ............. B64G 1/68; B64G 3/00; G06V 20/13
See application file for complete search history.

(56) References Cited

U.S. PATENT DOCUMENTS

| | | | |
|---|---|---|---|
| 9,189,451 | B1 | 11/2015 | Freedman et al. |
| 12,263,966 | B1 | 4/2025 | Rakshit et al. |
| 2016/0264268 | A1 | 9/2016 | Aylmer |
| 2022/0402635 | A1 | 12/2022 | Mukae |
| 2024/0150044 | A1 | 5/2024 | Vance et al. |

OTHER PUBLICATIONS

"10 Things: What's That Space Rock?", NASA Science Editorial Team, Jul. 21, 2022, 19 pages, https://science.nasa.gov/solar-system/10-things-whats-that-space-rock/.
"ESA the cost of space debris", Jul. 5, 2020, 9 pps., <https://www.esa.int/Safety_Security/Space_Debris/The_cost_of_space_debris>.

(Continued)

*Primary Examiner* — Rodney A Bonnette
(74) *Attorney, Agent, or Firm* — Aaron N. Pontikos

(57) ABSTRACT

Provided is a method, system, and computer program product for determining a degree of impact caused by space debris. A processor may receive data from a data stream of one or more satellites, the data including observational data of one or more objects in orbit. The processor may determine, based on an analysis of the observational data, that the one or more objects are space debris. The processor may identify, based on the analyzed observational data, ownership of the one or more objects that are determined to be space debris. The processor may determine, using one or more smart contracts, a degree of impact caused by the one or more objects that are space debris, where the degree of impact is attributed to an identified owner of the one or more objects.

20 Claims, 6 Drawing Sheets

(56)         References Cited

OTHER PUBLICATIONS

"Space Debris and Human Spacecraft", NASA, May 26, 2021, 6 pps., /www.nasa.gov/mission_pages/station/news/orbital_debris. html>.

Authors et al., "Method and System for Recycling Space Debris with In-Space Manufacturing", An IP.com Prior Art Database Technical Disclosure, IP.com No. IPCOM000271170D, IP.com Electronic Publication Date: Nov. 2, 2022, 5 pps., <https://priorart.ip. com/IPCOM/000271170>.

Carroll, "Bounties on Orbital Debris?", First Int'l. Orbital Debris Conf. (2019), 10 pps., <https://www.hou.usra.edu/meetings/ orbitaldebris2019/orbital2019paper/pdf/6143.pdf>.

Robinson, "Space Debris: The Legal Issues", Royal Aeronautical Society, Jan. 3, 2014, 15 pps., <https://www.aerosociety.com/news/ space-debris-the-legal-issues/>.

Schaub et al., "Cost and risk assessment for spacecraft operation decisions caused by the space debris environment", Acta Astronautica 1 3 (2015) 66-79, <https://www.sciencedirect.com/science/article/ abs/pii/S0094576515001289>.

United States Non-Final Rejection dated Oct. 9, 2024, 12 pages, in U.S. Appl. No. 18/371,185.

United States Notice of Allowance dated Feb. 5, 2025, 09 pages, in U.S. Appl. No. 18/371,185.

300

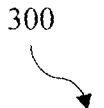

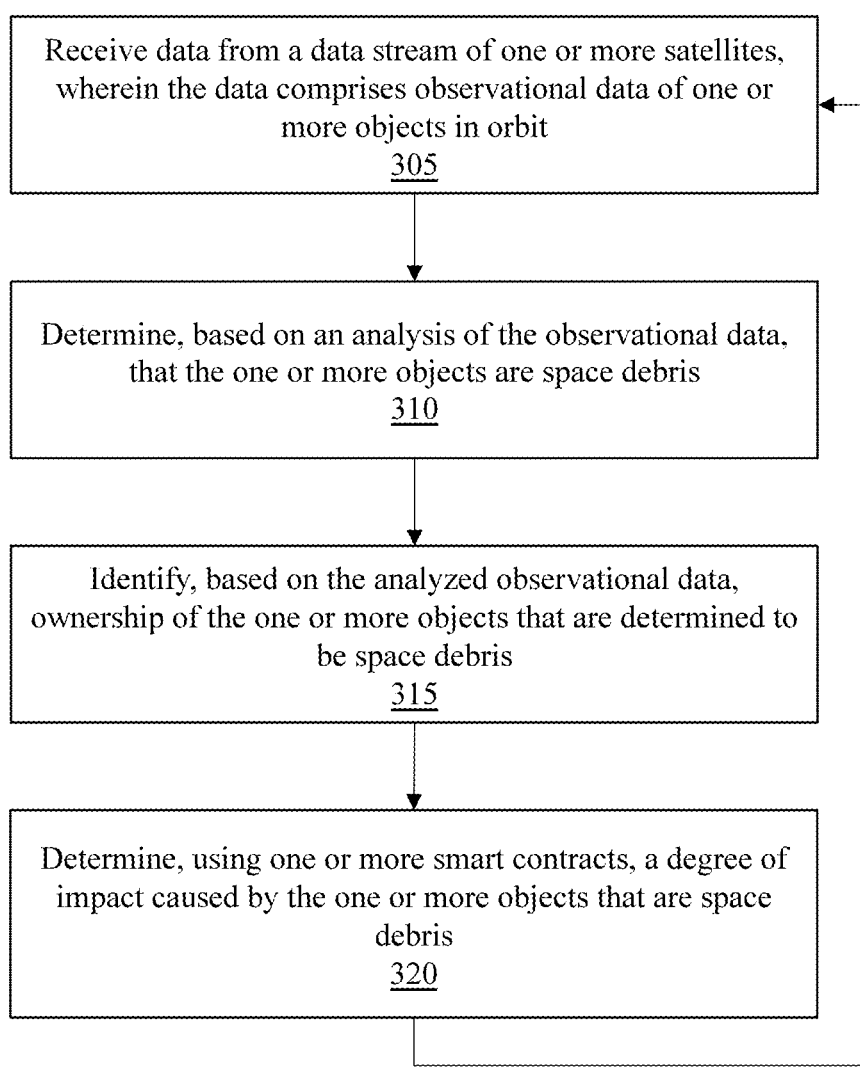

Receive data from a data stream of one or more satellites, wherein the data comprises observational data of one or more objects in orbit
305

Determine, based on an analysis of the observational data, that the one or more objects are space debris
310

Identify, based on the analyzed observational data, ownership of the one or more objects that are determined to be space debris
315

Determine, using one or more smart contracts, a degree of impact caused by the one or more objects that are space debris
320

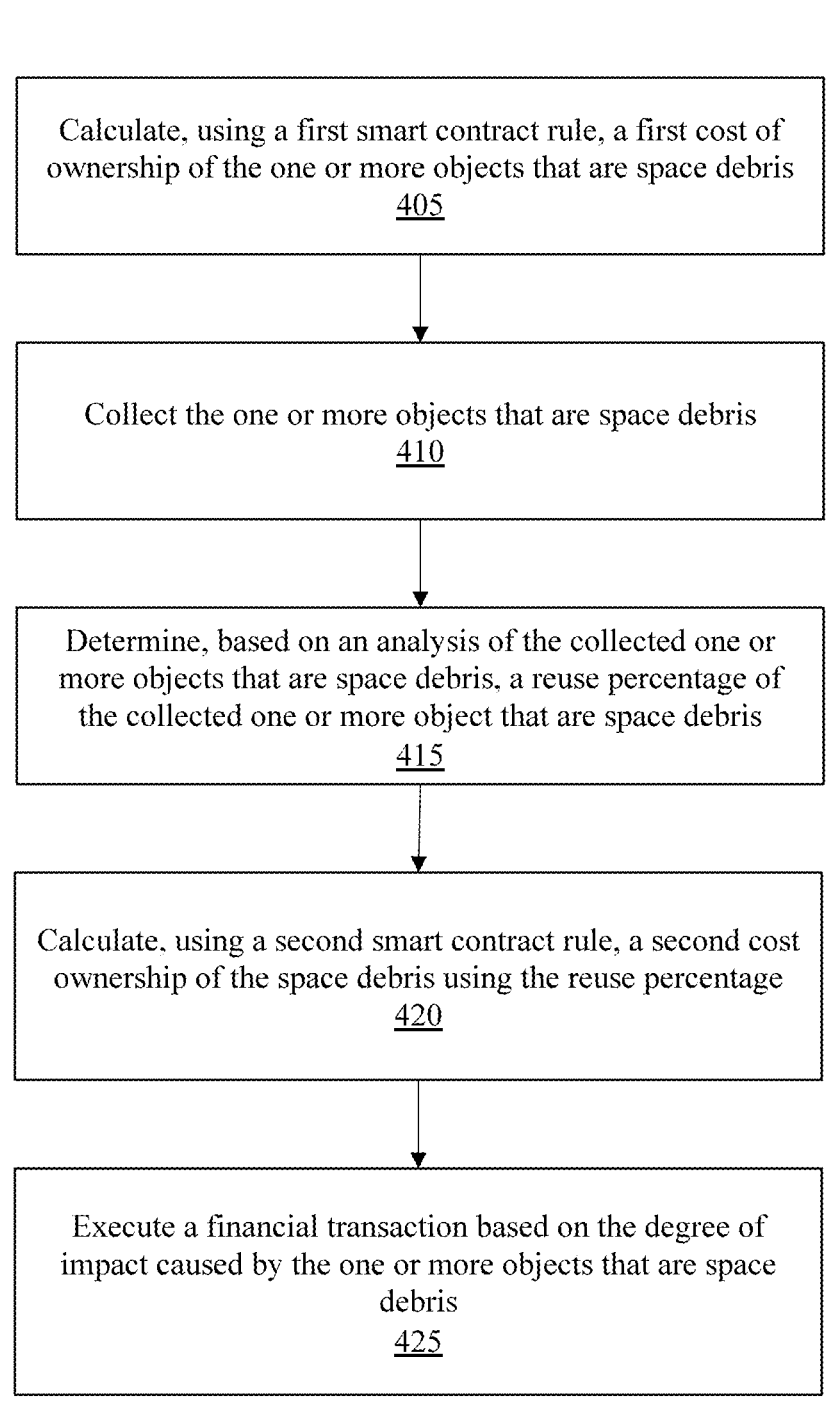

Calculate, using a first smart contract rule, a first cost of ownership of the one or more objects that are space debris
405

Collect the one or more objects that are space debris
410

Determine, based on an analysis of the collected one or more objects that are space debris, a reuse percentage of the collected one or more object that are space debris
415

Calculate, using a second smart contract rule, a second cost ownership of the space debris using the reuse percentage
420

Execute a financial transaction based on the degree of impact caused by the one or more objects that are space debris
425

FIG. 4

COMPUTER SYSTEM
501

PROCESSOR
502

CPU
502A

CPU
502B

CPU
502C

CPU
502D

MEMORY BUS 503

MEMORY
504

CACHE
524

RAM
522

STORAGE
SYSTEM
526

528

530

I/O BUS INTERFACE  510

I/O BUS 508

TERMINAL
INTERFACE
512

I/O DEVICE
INTERFACE
514

STORAGE
INTERFACE
516

NETWORK
INTERFACE
518

600

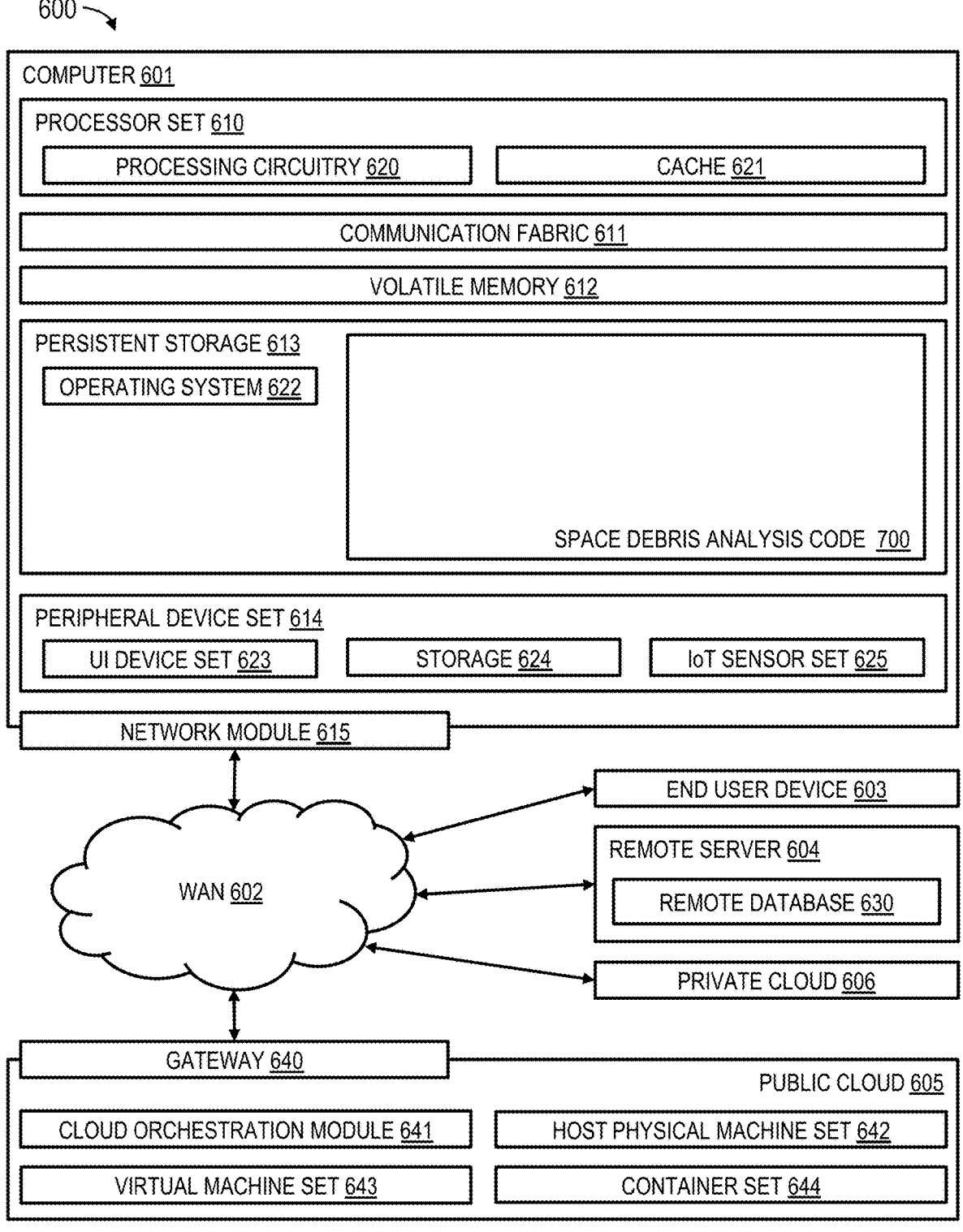

COMPUTER 601

PROCESSOR SET 610

PROCESSING CIRCUITRY 620      CACHE 621

COMMUNICATION FABRIC 611

VOLATILE MEMORY 612

PERSISTENT STORAGE 613

OPERATING SYSTEM 622

SPACE DEBRIS ANALYSIS CODE 700

PERIPHERAL DEVICE SET 614

UI DEVICE SET 623     STORAGE 624     IoT SENSOR SET 625

NETWORK MODULE 615

WAN 602

END USER DEVICE 603

REMOTE SERVER 604

REMOTE DATABASE 630

PRIVATE CLOUD 606

GATEWAY 640

PUBLIC CLOUD 605

CLOUD ORCHESTRATION MODULE 641     HOST PHYSICAL MACHINE SET 642

VIRTUAL MACHINE SET 643     CONTAINER SET 644

FIG. 6

AUTOMATED DETERMINATION OF COST OWNERSHIP OF SPACE DEBRIS

BACKGROUND

The present disclosure relates generally to the field of orbital satellites and, more specifically, to analyzing observational data of space debris and determining a degree of impact caused by the space debris by utilizing smart contract rules.

Space debris encompasses both natural meteoroid and artificial (human-made) orbital debris. Meteoroids are in orbit about the sun, while most artificial debris is in orbit about the Earth (hence the term "orbital" debris). Orbital debris is any human-made object in orbit about the Earth that no longer serves a useful function. Such debris includes nonfunctional spacecraft, abandoned launch vehicle stages, mission-related debris, and fragmentation debris.

There are approximately 23,000 pieces of debris larger than a softball orbiting the Earth. They travel at speeds up to 17,500 mph, fast enough for a relatively small piece of orbital debris to damage a satellite or a spacecraft. There are half a million pieces of debris the size of a marble or larger (up to 0.4 inches, or 1 centimeter) or larger, and approximately 100 million pieces of debris about 0.04 inches (or one millimeter) and larger. There is even smaller micrometer-sized (0.000039 of an inch in diameter) debris.

For example, small particles such as paint flecks can damage a spacecraft when traveling at high velocities. For example, a number of space shuttle windows required replacement because of damage caused by material that was analyzed and shown to be paint flecks. In fact, millimeter-sized orbital debris represents the highest mission-ending risk to most robotic spacecraft operating in low Earth orbit.

SUMMARY

Embodiments of the present disclosure include a method, system, and computer program product for determining a degree of impact caused by space debris. A processor may receive data from a data stream of one or more satellites, wherein the data comprises observational data of one or more objects in orbit. The processor may determine, based on an analysis of the observational data, that the one or more objects are space debris. The processor may identify, based on the analyzed observational data, ownership of the one or more objects that are determined to be space debris. The processor may determine, using one or more smart contracts, a degree of impact caused by the one or more objects that are space debris, wherein the degree of impact is attributed to an identified owner of the one or more objects.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 3 illustrates a flow diagram of an example process for determining a degree of impact caused by space debris, in accordance with embodiments of the present disclosure.

FIG. 4 illustrates a flow diagram of an example process for calculating a degree of impact caused by space debris using smart contract rules, in accordance with embodiments of the present disclosure.

FIG. 6 depicts a schematic diagram of a computing environment for executing program code related to the methods disclosed herein and for space debris analysis, according to at least one embodiment.

Figure 1:
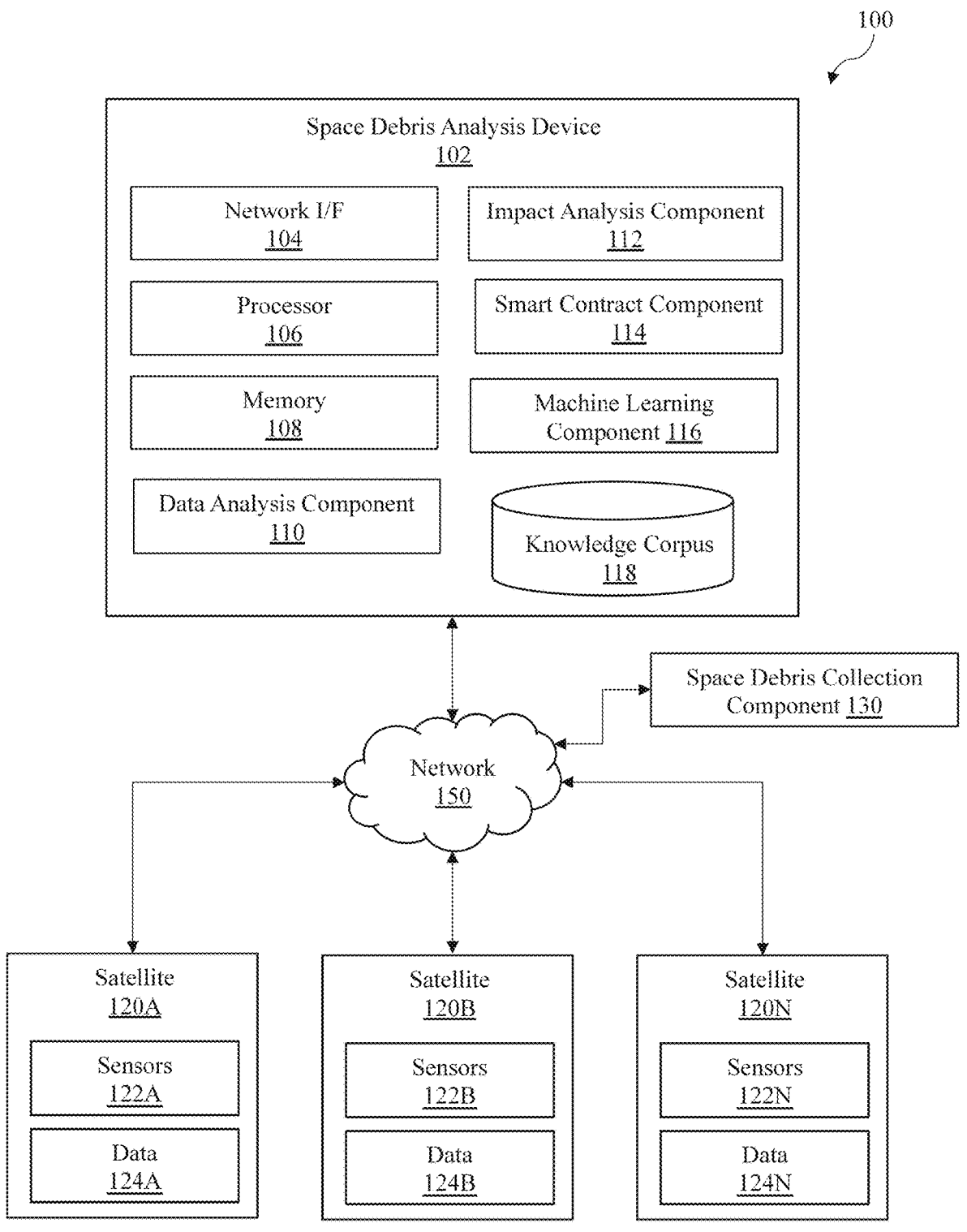
FIG. 1 illustrates a block diagram of an example space debris analysis system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of satellites and, more particularly, to analyzing observational data of space debris and determining total cost ownership of the space debris by utilizing smart contract rules. While the present disclosure is not necessarily limited to such applications, various aspects of the disclosure may be appreciated through a discussion of various examples using this context.

Various corporations and/or governmental agencies launch satellites into orbit for many different uses. For example, most satellites are used for communication purposes (e.g., telecommunications, imaging, etc.). However, some satellites may become non-operational over time, and thus be considered space debris. In some instances, these non-operational satellites may collide with fully functional satellites causing significant and/or catastrophic damage. However, in many instances the ownership of the non-functional satellite that caused the collision may not be known (e.g., due to age of the non-functional satellite). In such an instance, the expense for replacing the damaged satellite may be passed on to an owner that is not at fault for the collision. Therefore, an accurate and effective method of identifying the ownership of space debris is needed in order to properly attribute the expenses related to the sparce debris to the proper owner.

Embodiments of the present disclosure include a method, system, and computer program product that automatically determine a degree of impact caused by space debris. In embodiments, the system may receive data from a data stream of one or more satellites, where the data comprises observational data of one or more objects in orbit. For example, a plurality of orbiting satellites may include one or more cameras that are configured to generate observational image data used to determine which objects in orbit are space debris. The cameras may be any type of camera such as visual cameras, thermal cameras, etc., that capture the surrounding orbital environment.

In embodiments, the satellites may communicate with each other to create a satellite mesh network allowing each of the satellites to determine which of the given satellites are communicatively connected. Each satellite may be identified uniquely based on image data of the given satellite (e.g., using image recognition) or by collecting and analyzing contextual data associated with the satellite (e.g., metadata, satellite log data, identification data, manufacturing data, etc.). This data may be used to determine a manufacturer and/or owner of the given satellites. In some embodiments, the manufacturer and owner can be same or different. In embodiments, the orbiting satellites are configured to collaborate with each other in order to create a crowdsourced satellite network and a distributed computing system.

In embodiments, the system may determine, based on an analysis of the observational data, that the one or more objects are space debris. For example, the system will determine based on the captured images from each satellite, and through satellite-to-satellite communication, the statuses of the other satellites within the mesh network. If any satellite has lost communication with the other satellites within the network, then the system may determine that the non-communicating satellite is non-operational and therefore space debris.

In some embodiments, the system may analyze the observational data generated from the camera feeds to identify if any satellite becomes space debris as a result of a collision with a non-functional satellite or other space debris (e.g., collision with smaller space debris or particle). For example, the system may analyze the camera feed from a first satellite and determine visually from the feed that a second satellite is space debris because it has been damaged by a collision with another object. The system may further use additional analysis of other observational data to confirm that the second satellite is space debris. For example, the system my analyze orbital trajectory data associated with the second satellite and determine that the second satellite is no longer following its normal orbital path, which may further indicate that the second satellite is no longer operational.

In embodiments, the system may identify, based on the analyzed observational data, ownership of the one or more objects that are determined to be space debris. For example, the system may determine from the observational data a unique identifier for the satellite's manufacturer and/or the owner of the satellite.

In embodiments, the system may determine, using one or more smart contracts, a degree of impact caused by the one or more objects that are space debris. The system may attribute the degree of impact caused by the one or more objects to an identified owner. In some embodiments, the system may use a first smart contract rule and a second contract rule to calculate the degree of impact caused by the objects that are determined to be space debris.

In embodiments, the first smart contract rule may automatically calculate the degree of impact associated to the space debris, e.g., how much cost is to be paid by the owner of the space debris that has impacted other objects, such as functional satellites. The degree of impact associated to the space debris may be based on a variety impact attributes. For example, the presence of any space debris within a satellites orbital path may require changing the path to another orbital path in order to avoid collision with the space debris. However, there may be expenses involved when changing orbital path. For example, changing the orbital path might cause a disruption in service provided by the satellite which is costly to the given owner. The system is configured to calculate these impact attributes and pass them on to the determined owner of the space debris. In some embodiments, the system may use image analysis algorithms and/or computer vision techniques (e.g., shifting, placing, segmentation, etc.) that accurately predict the orbital path of objects that are determined to be space debris. For example, based on current trajectories, the system may determine whether the orbital trajectory of an object that is determined to be space debris will affect other objects in orbit, such as operational satellites. The determined orbital path may be used when assessing the degree of impact attributed to the owner of the space debris. Other impact attributes may include various damages caused to other satellites by the given space debris, space debris collection costs, and/or impact damages related to the size of the space debris.

In embodiments, the second smart contract rule may be used to calculate offset recovery costs of the space debris. For example, the system may collect the space debris using a space debris collection component. After collecting the space debris, the system is configured to perform a reuse analysis and/or inspection of the space debris to identify if any space debris can be reused as a spare part or used for any pre-processing such as melting of metals.

In some embodiments, the system may utilize various image recognition algorithms or computer vision techniques to identify what type of space debris is collected and/or captured in the image data generated from the satellites. The system may search a digital twin corpus or knowledgebase comprising digital twins of various known space objects/satellites to identify a same or substantially similar object that matches the space debris. For example, the system may use various image recognition algorithms to match various parts that are intact of the space debris to parts of a digital twin of a complete satellite in a perfect state. The parts that remain intact on the space debris may be identified when calculating the reuse percentage and/or reuse cost that can offset the degree of impact caused by the space debris. The system may use image recognition algorithms to extract various features or attributes of the space debris to determine a reuse percentage. The features may include, for example, angles and positioning of certain components (e.g., angle tilt of various components/loose parts), the presence of defects (e.g., dents, damaged areas, wear, missing parts, or components, etc.), and/or type of material used to construct the object/space debris. As would be recognized by one of ordinary skill in the art, other features may be extracted depending on the type of object/space debris, and the examples given herein should not be construed as limiting.

The system may determine how the features of the space debris in its defective state correspond/compare to the features of other similar objects in an operational state and whether some of the components may be reused. Based on the comparison, the system will calculate a reuse percentage for the object and use this percentage when calculating cost recovery of the space debris. If no parts or components are reusable, the reuse percentage may be determined to be zero where none of the ownership costs are offset.

In embodiments, the smart contract may auto execute a final transaction that charges the degree of impact caused by the space debris to the determined/identified owner. In this way, any owner of space debris is held financially responsible for any damages and/or disruption of service costs caused by the space debris in orbit.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of an example space debris analysis system 100, in accordance with embodiments of the present disclosure. In the illustrated embodiment, space debris analysis system 100 includes space debris analysis device 102 that is communicatively coupled to satellite 120A, satellite 120B, satellite 120N, and space debris collection component 130 via network 150. Space debris analysis device 102, satellites 120A-N, and space debris collection component 130 may include any type of computer system and may be substantially similar to computer system 501 of FIG. 5. In some embodiments, space debris analysis device 102, satellites 120A-N, and space debris collection component 130 may be configured as separate standalone systems or as one or more integrated system. For example, space debris analysis device 102 may be included with satellites 120A-N as an integrated space debris analysis system, where each satellite 120A-N includes space debris analysis device 120 onboard, while in some embodiments, each device may be separate and communicatively connected to each other over network 150 (e.g., satellite mesh network). In some embodiments, space debris collection component 130 may be included with one or more of satellites 120A-N, such that the given satellite may be configured to collect space debris.

Network 150 may be any type of communication network, such as a wireless network or a cloud computing network. Network 150 may be substantially similar to, or the same as, a computing environment 600 described in FIG. 6. In some embodiments, network 150 can be implemented within a cloud computing environment or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over network 150. In some embodiments, network 150 can be implemented using any number of any suitable communications media. For example, the network may be a satellite mesh network, wide area network (WAN), a local area network (LAN), an internet, an intranet, or any combination thereof. In certain embodiments, the various systems may be local to each other, and communicate via any appropriate local communication medium. For example, space debris analysis device 102 may communicate with satellites 120A-N using a satellite mesh network, one or more hardwire connections (e.g., an Ethernet cable), and/or wireless communication networks. In some embodiments, the various systems may be communicatively coupled using a combination of one or more networks and/or one or more local connections. For example, in some embodiments, space debris analysis device 102 may communicate with network 150 using a hardwired connection, while communication between satellites 120A-N and network 150 may be through a wireless satellite mesh network. In embodiments, satellites 120A-N may be communicatively coupled such that data 124A-N may be shared between the satellites 120A-N and/or space debris analysis device 102.

In In embodiments, satellites 120A-N include sensors 122A-N and data 124A-N. Sensors 122A-N may be any type of sensor that is configured to generate data 124A-N. For example, sensors 122A-N may include cameras, proximity sensors, radar, light sensors, laser sensors, satellite positioning sensors, etc. that may be used to generate observational data regarding objects orbiting Earth.

In the illustrated embodiment, space debris analysis device 102 includes network interface (I/F) 104, processor 106, memory 108, data analysis component 110, impact analysis component 112, smart contract component 114, machine learning component 116, and knowledge corpus 118.

In embodiments, data analysis component 110 is configured to analyze various types of observational data (data 124A-N) collected/received from satellites 120A-N to determine whether various objects in orbit are space debris. In some embodiments, data analysis component 110 may use various image recognition algorithms to analyze observational image data of one or more objects in orbit. For example, the data analysis component 110 may analyze observational image data 124A from satellite 120A that shows satellite 120B has been/or being damaged by a space collision (e.g., struck by space debris, meteoroid, non-functional satellite, etc.). Using the analyzed images, the data analysis component 110 may determine that satellite 120B is space debris because it has been damaged making the satellite non-operational. Data analysis component 110 may analyze additional observational data to determine that the satellite 120B is non-operational. For example, lack of communication data received from satellite 120B over a predetermined time threshold may confirm the non-operational status.

In some embodiments, data analysis component 110 may analyze image data of space debris collected by space debris collection component 130. For example, data analysis component 110 may analyze image data of space debris to determine a reuse percentage of the space debris. The reuse percentage may be used to reduce the degree of impact and/or cost related to damages caused by the space debris. In some embodiments, to calculate the reuse percentage, the data analysis component 110 may use image recognition algorithms to identify one or more differences between an object identified/classified as space debris when compared to a digital twin of the object in a perfect state (e.g., damaged satellite vs. digital twin of the satellite in the perfect state). The data analysis component 110 may identify what type of object is shown in the one or more images of the non-conforming object and search the knowledge corpus 118 for a digital twin of a same or substantially similar object in a perfect state. Once the physical object is identified, and a matching digital twin is found, the data analysis component 110 may perform a reuse/cost analyze the difference(s) between the actual state of the physical object in the images in comparison with the perfect state of the object form the digital twin. In this way, the space debris analysis device 102 may determine how much material/reuse can be obtained from the space debris/object which may reduce the degree of impact caused by the space debris.

In embodiments, data analysis component 110 may use image recognition algorithms to extract various features or attributes of the space debris/object and compare those features/attributes to the features/attributes of the digital twin of the space debris/object in the perfect state. The features may include, for example, angles and positioning of certain components (e.g., angle tilt, loose parts), the presence of defects (e.g., dents, damaged areas, wear, missing parts or components, etc.), color and/or type of material used to construct the space debris/object. As would be recognized by one of ordinary skill in the art, other features may be extracted depending on the type of object, and the examples given herein should not be construed as limiting. The data analysis component 110 may determine how the features of the space debris/object in its actual state correspond and/or compare to the features of the digital twin of the object in the perfect state. Based on the comparison, the image analysis component 110 will generate a reuse percentage for the object that has been determined to be space debris. The reuse percentage may be used to calculate cost recovery for the space debris.

In embodiments, the data analysis component 110 may search a knowledge corpus 118 for one or more digital twins of objects that are substantially similar or match the space debris/object. In embodiments, the knowledge corpus 118 may include a plurality of known digital twins of objects/satellites. The matching digital twin of the object may be used to identify the owner of the space debris. In some embodiments, knowledge corpus 118 may receive crowd-sourced data from one or more other users (e.g., images/information related to various space objects) used for ownership identification.

In embodiments, impact analysis component 112 is configured determine a degree of impact cause by the one or more objects that are determined/identified to be space debris. The impact analysis component 112 may score or rank objects according to impact costs or damages caused to other objects (e.g., functional satellites) that correspond to the dimensions and/or orbital path of the space debris. For example, larger objects may be ranked/scored higher than smaller objects. However, the ranking of a smaller object may be increased if the probability/confidence of the smaller object colliding with an active satellite is high. Using the ranking, the impact analysis component 112 can ascribe a degree of impact value to the owner of the given object that is space debris.

In embodiments, the smart contract component 114 is configured to implement one or more smart contract rules for attributing the degree of impact caused by the space debris to one or more identified owners. For example, the smart contract component 114 may use two start contract rules to calculate the degree of impact caused by the space debris. A first smart contract rule calculates the cost associated to the space debris, e.g., how much cost is to be paid by the owner of the debris based on the impact it has caused to other orbital objects. The second smart contract rule will calculate how much cost can be recovered by the owner of the space debris by determining if any components of the space debris can be reused (e.g., reusing smaller functional components of a non-operational satellite that is determined to be space debris). This may be based on the reuse percentage. Using both the first and second smart contract rules, the degree of impact caused by the space debris can be determined and attributed to the identified owner of each given piece of space debris.

In embodiments, machine learning component 116 may collect, monitor, and/or analyze various data (image capture data, digital twin modeling, crowdsourced satellite data) related to the space debris analysis system 100. Using the various data, machine learning component 116 may automatically implement and/or adjust attributes for determining the degree of impact caused by the space debris to meet conformance thresholds. For example, machine learning component 116 may analyze historic image data and/or associated reuse percentage determinations and determine whether the data analysis component 110 was accurate in making its predictions. The machine learning component 116 may use feedback from any cost adjustments to the reuse percentage factored into historical impact determinations caused by space debris. Using the feedback, the machine learning component 116 can adjust image recognition algorithms used to determine the reuse percentage of the various space debris/object. In this way, the machine learning component 116 can improve accuracy of providing accurate reuse percentages which are used to determine the degree of impact of the space debris.

In embodiments, machine learning component 116 may utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

FIG. 1 is intended to depict the representative major components of space debris analysis system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with space debris analysis system 100 may not be present, and the arrangement of components may vary. For example, while FIG. 1 illustrates an example space debris analysis system 100 having a single space debris analysis device 102, three satellites 120A-N, and a single space debris collection component 130 that are communicatively coupled via a single network 150, suitable network architectures for implementing embodiments of this disclosure may include any number of space debris analysis devices, satellites, space debris collection components, and networks. The various models, modules, systems, and components illustrated in FIG. 1 may exist, if at all, across a plurality of space debris analysis devices, satellites, space debris collection components, and networks.

Figure 2:
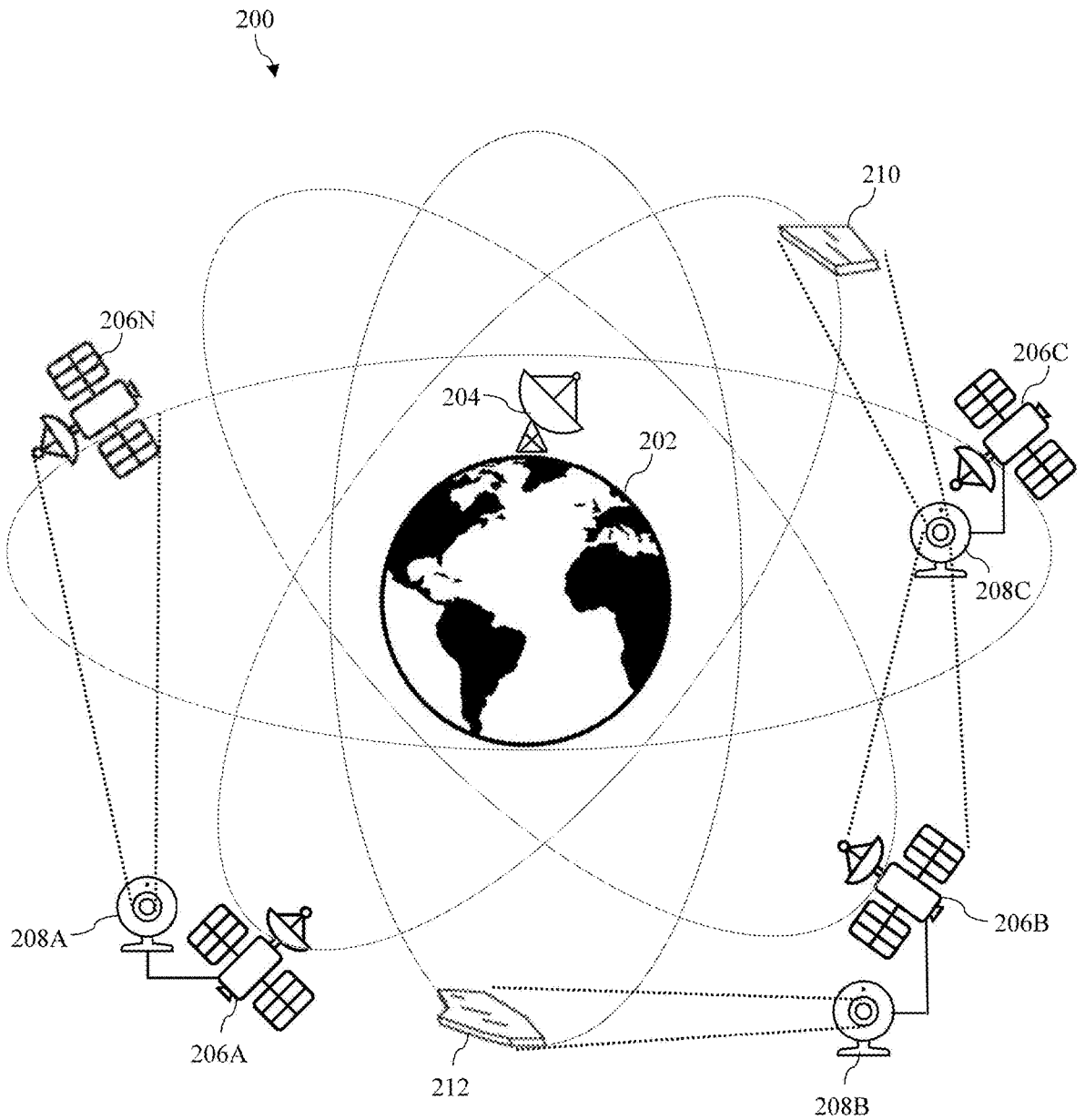
FIG. 2 illustrates an example diagram of orbital paths of a plurality of satellites, in accordance with embodiments of the present disclosure.

Referring now to FIG. 2, shown is an example diagram of orbital paths 200 of a plurality of satellites 206, in accordance with embodiments of the present disclosure. In the illustrated embodiment, satellite 206A, satellite 206B, satellite 206C, and satellite 206N (collectively referred to as satellites 206) are shown orbiting earth 202 along a plurality of orbital paths 200. Satellite 206A, satellite 206B, and satellite 206C include camera 208A, camera 208B, and 208C, respectively. In some embodiments, the satellites 206 are communicatively connected/coupled to each other using a wireless network (e.g., satellite mesh network) such that observational data may be shared between the satellites 206 themselves, and/or sent and received by communication station 204. In embodiments, the observational data generated by the cameras 208 and/or satellites 206 may be analyzed by space debris analysis system 100 of FIG. 1, which may be located on communication station 204 and/or on one or more of the satellites 206. Based on the analysis of the observational data, the space debris analysis system 100 may identify which objects that are in orbit are space debris.

For example, using image data generated from cameras 208, the space debris analysis system 100 may determine that object 210 and object 212 are space debris. Space debris system 100 may utilize image recognition algorithms to identify whether objects are space debris. For example, the presence of damage (e.g., broken pieces, defects, etc.) may indicate that an object is space debris. In some embodiments, the space debris system 100 may determine one or more satellites are determined to be space debris. For example, observation data from camera 208A may be analyzed and used to determine that satellite 206N is space debris. This may be based on image data showing that the satellite 206N is no longer aimed at Earth 202 and/or a loss in communication data received from satellite 206N by the other satellites or communication station 204 over a threshold period of time (e.g., indication that the satellite is no longer working).

In some embodiments, space debris analysis system 100 may determine the degree of impact caused by the space debris by using image recognitions and/or computer vision techniques. For example, image analysis may be used to identify various unique identifiers related to the ownership of a given object in orbit. For example, using image recognition, various insignia and/or identification numbers may be determined from observational data of object 210 generated by camera 208C as it passes satellite 202C in orbit. In some embodiments, space debris analysis system 100 may determine the degree of impact caused by the space debris by identifying various impact attributes associated with the given object. For example, object 210 is shown on the same orbital path as satellite 206A. If satellite 206A maintains the same orbital path it may collide with object 210 at some point. In order to avoid a collision, satellite 206A may adjust is orbital path to a different orbital path to avoid the object 210, however, this may result in a loss of service associated with satellite 206A. Using these impact attributes (e.g., cost incurred for loss of service) the system may automatically determine what ownership costs may be passed on to the determined owner of the object 210. In this way, various impact related costs caused by the space debris (e.g., damage to other objects/satellites and/or incurred expenses) may be attributed to the determined owner of space debris.

It is noted that the illustrated embodiment is not meant to be limiting, the various types of objects, satellites, and/or space debris may be ubiquitous as would be recognized by one skilled in the art.

Referring now to FIG. 3, shown is an example process diagram 300 for determining a degree of impact caused by space debris, in accordance with embodiments of the present disclosure. The process 300 may be performed by processing logic that comprises hardware (e.g., circuitry, dedicated logic, programmable logic, microcode, etc.), software (e.g., instructions run on a processor), firmware, or a combination thereof. In some embodiments, the process 300 is a computer-implemented process. In embodiments, the process 300 may be performed by processor 106 of space debris analysis device 102 exemplified in FIG. 1.

In embodiments, the process 300 begins by receiving data from a data stream of one or more satellites, wherein the data comprises observational data of one or more objects in orbit. This is shown at step 305. In some embodiments, the one or more satellites comprise a plurality of satellites that are communicatively connected, where each satellite of the plurality of satellites includes a camera that generates image data of the observational data of the one or more objects in orbit. In some embodiments, the one or more objects may be other satellites (e.g., non-operational satellites that remain in orbit).

The process 300 continues by determining, based on an analysis of the observational data, that the one or more objects are space debris. This is shown at step 310. In some embodiments, the determining that the one or more objects are space debris may further include analyzing, using image recognition, the image data of the observational data of the one or more objects in orbit; identifying, based on the analyzing, that a first object of the one or more objects has collided with a second object of the one or more objects, where at least one of the first object or the second object is a first satellite of the plurality of satellites; and determining, based on the identifying, that the first satellite is space debris. For example, if a satellite is struck by another object and damage to the point of being non-operational (e.g., through analysis of the image data), then the space debris analysis device 102 may determine that the newly damaged satellite is now considered space debris.

In some embodiments, the determining that the one or more objects are space debris may include calculating, based on the analysis of the observational data, a time length value for a loss of communication data received from a first satellite of the one or more satellites; comparing the time length value to a predetermined time threshold; and determining, based on the predetermined time threshold being met, that the first satellite is space debris. For example, a satellite that has become non-operational due to a communication loss may be determined to be space debris once communication has been lost for a predetermined time (e.g., 1 day, 1 week, etc.).

The process 300 continues by identifying, based on the analyzed observational data, ownership of the one or more objects that are determined to be space debris. This is shown at step 315. In some embodiments, identifying the ownership of the one or more objects that are determined to be space debris includes using image recognition to identify one or more unique identifiers on the one or more objects that indicate ownership of a given object. For example, using image recognition on the observation data, the space debris analysis device 102 may identify various insignia and/or identification numbers on the damaged satellite and determine ownership. In some embodiments, the ownership of the damage satellite/space debris may be identified by analyzing contextual data associated with space debris (e.g., prior communication data over the satellite mesh network, prior space logs, documents, metadata, etc.).

The process 300 continues by determining, using one or more smart contracts, a degree of impact caused by the one or more objects that are space debris. This is shown at step 320. For example, the space debris analysis device 102 may use one or more smart contracts that automatically execute when the degree of impact caused by the space debris is determined. The smart contract may execute when various conditions are met. For example, once the ownership of the space debris is determined, any additional impact damages and/or costs associated with the space debris are calculated (e.g., disruption of service costs effecting other satellites), and after the space debris is collected and analyzed for reuse purposes, any reuse cost may be deducted from the degree of impact caused by the space debris. Once all costs are determined, the smart contract may execute a financial transaction were any costs related to the space debris are automatically attributed to the owner. This is further detailed in process 400 of FIG. 4 below.

In some embodiments, the determination of the degree of impact caused by the one or more objects that are space debris may include determining, based on the analysis of the observational data, that a first satellite of the one or more satellites has changed from a first orbital path to a second orbital path to avoid colliding with a first object of the one or more objects in orbit; calculating a cost value for changing from the first orbital path to the second orbital path, wherein the cost value is based on a cost evaluation of a disruption of service associated with the first satellite; and applying the cost value to the total ownership value of the first object of the one or more objects that is determined to be space debris. In this way, any costs related to disruption of service as a result of a satellite changing course due to space debris is passed on to the determined owner of the given space debris.

In some embodiments, the process 300 may return to step 305 where the data stream is continually monitored. In this way, the space debris analysis device 102 may continually assess whether objects within orbit are space debris and further determine the total cost ownership.

Referring now to FIG. 4, shown is a flow diagram of an example process 400 for calculating a degree of impact caused by space debris using smart contract rules, in accordance with embodiments of the present disclosure. The process 400 may be performed by processing logic that comprises hardware (e.g., circuitry, dedicated logic, programmable logic, microcode, etc.), software (e.g., instructions run on a processor), firmware, or a combination thereof. In some embodiments, the process 400 is a computer-implemented process. In some embodiments, process 400 may be in addition to or a sub-process of process 300. In embodiments, the process 400 may be performed by processor 106 of space debris analysis device 102 described in FIG. 1.

In embodiments, process 400 begins by calculating, using a first smart contract rule, a first cost of ownership of the one or more objects that are space debris, wherein the first cost of ownership is based on a set of impact attributes associated with the one or more objects. This is shown at step 405. In embodiments, the set of impact attributes are selected from a group of impact attributes consisting of: determined cost related to an impact of the one or more objects that are space debris with one or more satellites; dimensions of the one or more objects that are space debris; orbital path of the one or more objects that are space debris in relation to one or more orbital paths of the one or more satellites; and collection costs related to the one or more objects that are space debris. For example, impact attributes may be based on how much damaged has been caused by the space debris when colliding with another object (e.g., satellite), where lower costs may be attributed to minor damage (e.g., damage to minor features/components of another satellite) and higher costs are attributed to major damage (e.g., severe damage causing the satellite to become non-operational). Some costs can be related to the size of the debris, where costs associated with smaller objects are lower, while costs associated with larger objects are higher.

The process 400 continues by collecting the one or more objects that are space debris. This is shown at step 410. For example, the space debris analysis device 102 may use space debris collection component 130 of FIG. 1 to collect the space debris in order to determine whether it or any of its parts or components can be reused to offset costs of ownership.

The process 400 continues by determining, based on an analysis of the collected one or more objects that are space debris, a reuse percentage of the collected one or more object that are space debris. This is shown at step 415. For example, the space debris analysis device 102 may utilize image recognition algorithms to determine which parts or components may be reused for other satellites or various objects and then calculate an overall reuse percentage.

The process 400 continues by calculating, using a second smart contract rule, a second cost ownership of the space debris using the reuse percentage, wherein the degree of impact caused by the space debris is based on a difference between the first cost of ownership and the second cost of ownership. This is shown at step 420. For example, the space debris analysis device 102 may utilize the reuse percentage of the space debris to determine a total reuse value (second cost of ownership) of the space debris. This reuse value may be used to offset the first cost of ownership. For example, any reuse value that the space debris may have is subtracted from the first cost of ownership of the space debris, where the final total is the degree of impact that is attributed to the space debris.

The process 400 continues by executing a financial transaction based on the degree of impact caused by the one or more objects that are space debris. This is shown at step 425. For example, the smart contract may auto execute a final transaction that charges the degree of impact caused by the space debris to the determined/identified owner. In this way, any owner of space debris is held financially responsible for any damages and/or disruption of service costs caused by the space debris in orbit.

In embodiments, smart contracts are software program modules within a blockchain technical framework that enable participant owners to create transactions as blocks to the blockchain and read or query the blockchain. Additionally, the smart contracts can, based on their ability to query the blockchain, validate if a transaction is legitimate to be added as a block to the blockchain. That is, before adding an individual transaction block, the smart contracts can validate if there is a valid financial transaction block available in the blockchain for a cost of ownership of space debris and that the requirements of the smart contract have been met. Once the requirements of the smart contract have been met, the smart contract is auto executed, and the transaction is added to the blockchain.

In one exemplary embodiment, smart contracts may be set up based on a set of rules. For example, a scenario analysis may be done to design the rules. For example, if multiple owners of space debris are determined to be responsible for a collision with a functional satellite, then the owner of the destroy/damaged satellite may explore the option of identifying one or more owners using the set of rules are met. These rules may be defined by the multiple space debris owners, the ownership of functional satellites, and/or both, based on multiple different scenarios and make it a part of the smart contract.

The smart contracts are not tied to buyer-seller purchase agreements as smart contracts are a blockchain technical platform program deployed in all nodes to work across all buyer-seller purchase agreements and individual financial transactions.

Figure 5:
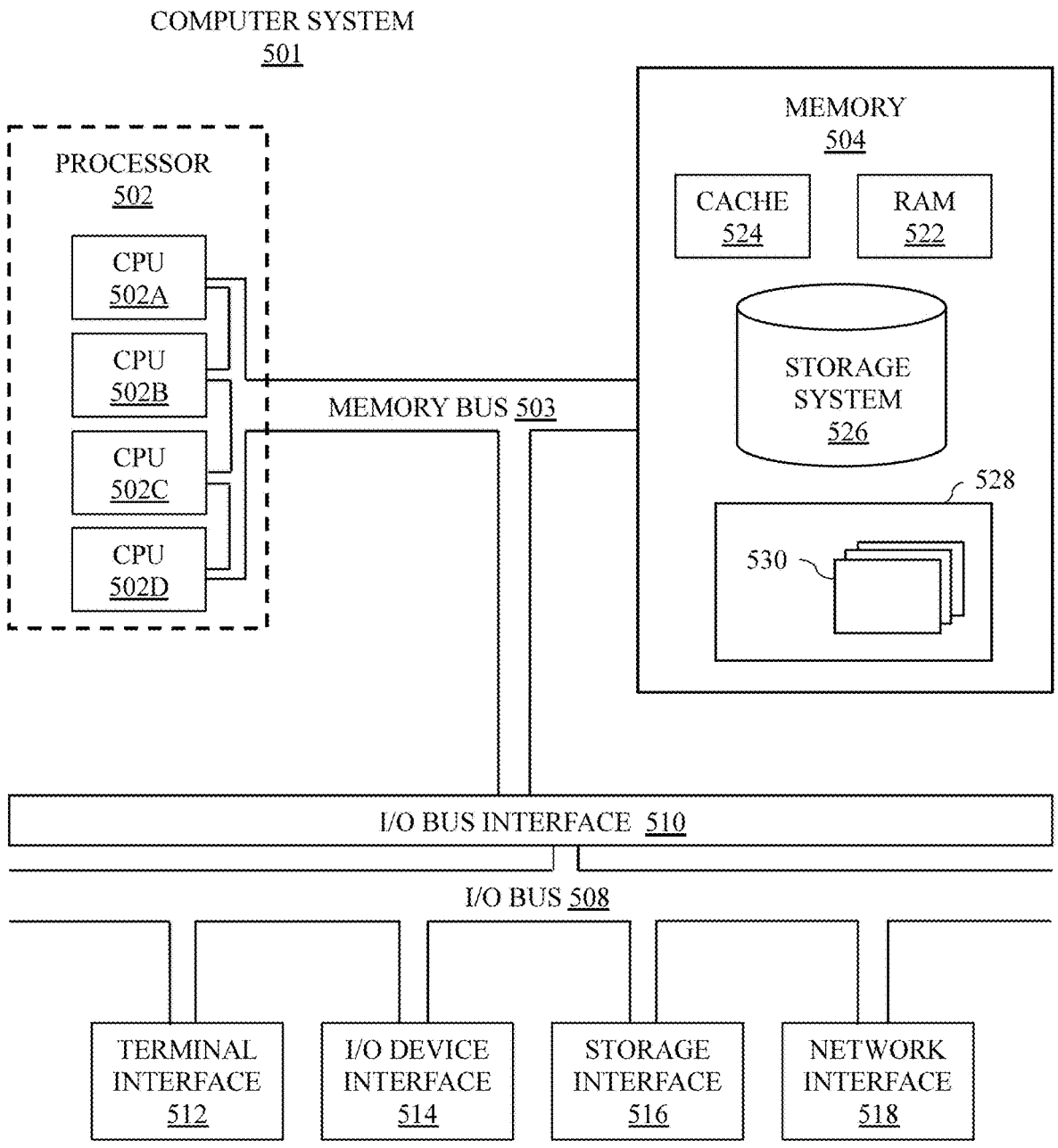
FIG. 5 illustrates a high-level block diagram of an example computer system that may be used in implementing one or more of the methods, tools, and modules, and any related functions, described herein, in accordance with embodiments of the present disclosure.

Referring now to FIG. 5, shown is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache. In some embodiments, a processor can include at least one or more of, a memory controller, and/or storage controller. In some embodiments, the CPU can execute the processes included herein (e.g., process 300 and 400 as described in FIG. 3 and FIG. 4, respectively). In some embodiments, the computer system 501 may be configured as space debris analysis system 100 of FIG. 1.

System memory subsystem 504 may include computer system readable media in the form of volatile memory, such as random-access memory (RAM) 522 or cache memory 524. Computer system 501 may further include other removable/non-removable, volatile/non-volatile computer system data storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 504 can include flash memory, e.g., a flash memory stick drive or a flash drive. Memory devices can be connected to memory bus 503 by one or more data media interfaces. The memory subsystem 504 may include at least one program product having a set (e.g., at least one) of program modules that are configured to carry out the functions of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single units, the computer system 501 may, in some embodiments, contain multiple I/O bus interfaces 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

One or more programs/utilities 528, each having at least one set of program modules 530 may be stored in memory subsystem 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 528 and/or program modules 530 generally perform the functions or methodologies of various embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electro-magnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Embodiments of the present disclosure may be implemented together with virtually any type of computer, regardless of the platform is suitable for storing and/or executing program code. FIG. 6 shows, as an example, a computing environment 600 (e.g., cloud computing system) suitable for executing program code related to the methods disclosed herein and for space debris analysis automation. In some embodiments, the computing environment 600 may be the same as or an implementation of the space debris analysis system 100.

Computing environment 600 contains an example of an environment for the execution of at least some of the computer code involved in performing the inventive methods, such as space debris analysis code 700. The space debris analysis code 700 may be a code-based implementation of the space debris analysis system 100. In addition to space debris analysis code 700, computing environment 600 includes, for example, a computer 601, a wide area network (WAN) 602, an end user device (EUD) 603, a remote server 604, a public cloud 605, and a private cloud 606. In this embodiment, the computer 601 includes a processor set 610 (including processing circuitry 620 and a cache 621), a communication fabric 611, a volatile memory 612, a persistent storage 613 (including operating a system 622 and the space debris analysis code 700, as identified above), a peripheral device set 614 (including a user interface (UI) device set 623, storage 624, and an Internet of Things (IoT) sensor set 625), and a network module 615. The remote server 604 includes a remote database 630. The public cloud 605 includes a gateway 640, a cloud orchestration module 641, a host physical machine set 642, a virtual machine set 643, and a container set 644.

The computer 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as the remote database 630. As is well understood in the art of computer technology, and depending upon the technology, performance of a computer-implemented method may be distributed among multiple computers and/or between multiple locations. On the other hand, in this presentation of the computing environment 600, detailed discussion is focused on a single computer, specifically the computer 601, to keep the presentation as simple as possible. The computer 601 may be located in a cloud, even though it is not shown in a cloud in FIG. 1. On the other hand, the computer 601 is not required to be in a cloud except to any extent as may be affirmatively indicated.

The processor set 610 includes one, or more, computer processors of any type now known or to be developed in the future. The processing circuitry 620 may be distributed over multiple packages, for example, multiple, coordinated integrated circuit chips. The processing circuitry 620 may implement multiple processor threads and/or multiple processor cores. The cache 621 is memory that is located in the processor chip package(s) and is typically used for data or code that should be available for rapid access by the threads or cores running on the processor set 610. Cache memories are typically organized into multiple levels depending upon relative proximity to the processing circuitry. Alternatively, some, or all, of the cache for the processor set may be located "off chip." In some computing environments, the processor set 610 may be designed for working with qubits and performing quantum computing.

Computer readable program instructions are typically loaded onto the computer 601 to cause a series of operational steps to be performed by the processor set 610 of the computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as the cache 621 and the other storage media discussed below. The program instructions, and associated data, are accessed by the processor set 610 to control and direct performance of the inventive methods. In the computing environment 600, at least some of the instructions for performing the inventive methods may be stored in the space debris analysis code 700 in the persistent storage 613.

The communication fabric 611 is the signal conduction path that allows the various components of the computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

The volatile memory 612 is any type of volatile memory now known or to be developed in the future. Examples include dynamic type random access memory (RAM) or static type RAM. Typically, the volatile memory 612 is characterized by random access, but this is not required unless affirmatively indicated. In the computer 601, the volatile memory 612 is located in a single package and is internal to the computer 601, but, alternatively or additionally, the volatile memory may be distributed over multiple packages and/or located externally with respect to the computer 601.

The persistent storage 613 is any form of non-volatile storage for computers that is now known or to be developed in the future. The non-volatility of this storage means that the stored data is maintained regardless of whether power is being supplied to the computer 601 and/or directly to the persistent storage 613. The persistent storage 613 may be a read only memory (ROM), but typically at least a portion of the persistent storage allows writing of data, deletion of data and re-writing of data. Some familiar forms of persistent storage include magnetic disks and solid state storage devices. The operating system 622 may take several forms, such as various known proprietary operating systems or open source Portable Operating System Interface-type operating systems that employ a kernel. The code included in the space debris analysis code 700 typically includes at least some of the computer code involved in performing the inventive methods.

The peripheral device set 614 includes the set of peripheral devices of the computer 601. Data communication connections between the peripheral devices and the other components of the computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, the UI device set 623 may include components such as a display screen, speaker, microphone, wearable devices (such as goggles and smart watches), keyboard, mouse, printer, touchpad, game controllers, and haptic devices. The storage 624 is external storage, such as an external hard drive, or insertable storage, such as an SD card. The storage 624 may be persistent and/or volatile. In some embodiments, the storage 624 may take the form of a quantum computing storage device for storing data in the form of qubits. In embodiments where the computer 601 is required to have a large amount of storage (for example, where the computer 601 locally stores and manages a large database) then this storage may be provided by peripheral storage devices designed for storing very large amounts of data, such as a storage area network (SAN) that is shared by multiple, geographically distributed computers. The IoT sensor set 625 is made up of sensors that can be used in Internet of Things applications. For example, one sensor may be a thermometer and another sensor may be a motion detector.

The network module 615 is the collection of computer software, hardware, and firmware that allows the computer 601 to communicate with other computers through the WAN 602. The network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of the network module 615 are performed on the same physical hardware device. In other embodiments (for example, embodiments that utilize software-defined networking (SDN)), the control functions and the forwarding functions of the network module 615 are performed on physically separate devices, such that the control functions manage several different network hardware devices. Computer readable program instructions for performing the inventive methods can typically be downloaded to the computer 601 from an external computer or external storage device through a network adapter card or network interface included in the network module 615.

The WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

The end user device (EUD) 603 is any computer system that is used and controlled by an end user (for example, a customer of an enterprise that operates the computer 601), and may take any of the forms discussed above in connection with the computer 601. The EUD 603 typically receives helpful and useful data from the operations of the computer 601. For example, in a hypothetical case where the computer 601 is designed to provide a recommendation to an end user, this recommendation would typically be communicated from the network module 615 of the computer 601 through the WAN 602 to the EUD 603. In this way, the EUD 603 can display, or otherwise present, the recommendation to an end user. In some embodiments, the EUD 603 may be a client device, such as thin client, heavy client, mainframe computer, desktop computer and so on.

The remote server 604 is any computer system that serves at least some data and/or functionality to the computer 601. The remote server 604 may be controlled and used by the same entity that operates computer 601. The remote server 604 represents the machine(s) that collect and store helpful and useful data for use by other computers, such as the computer 601. For example, in a hypothetical case where the computer 601 is designed and programmed to provide a recommendation based on historical data, then this historical data may be provided to the computer 601 from the remote database 630 of the remote server 604.

The public cloud 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of the public cloud 605 is performed by the computer hardware and/or software of the cloud orchestration module 641. The computing resources provided by the public cloud 605 are typically implemented by virtual computing environments that run on various computers making up the computers of the host physical machine set 642, which is the universe of physical computers in and/or available to the public cloud 605. The virtual computing environments (VCEs) typically take the form of virtual machines from the virtual machine set 643 and/or containers from the container set 644. It is understood that these VCEs may be stored as images and may be transferred among and between the various physical machine hosts, either as images or after instantiation of the VCE. The cloud orchestration module 641 manages the transfer and storage of images, deploys new instantiations of VCEs and manages active instantiations of VCE deployments. The gateway 640 is the collection of computer software, hardware, and firmware that allows the public cloud 605 to communicate through the WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 606 is similar to the public cloud 605, except that the computing resources are only available for use by a single enterprise. While the private cloud 606 is depicted as being in communication with the WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, the public cloud 605 and the private cloud 606 are both part of a larger hybrid cloud.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. In some embodiments, one or more of the operating system 622 and the space debris analysis code 700 may be implemented as service models. The service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving data from a data stream of one or more satellites, wherein the data comprises observational data of one or more objects in orbit;
determining, based on an analysis of the observational data, that a first satellite of the one or more satellites has changed from a first orbital path to a second orbital path to avoid colliding with a first object of the one or more objects in orbit; and
calculating a cost value for the first satellite changing from the first orbital path to the second orbital path, wherein the cost value is applied to a total cost of ownership for an owner of the first object and is based on a cost evaluation of a disruption of service associated with the first satellite.

2. The computer-implemented method of claim 1, wherein the one or more satellites comprise a plurality of satellites that are communicatively connected, and wherein each satellite of the plurality of satellites includes a camera that generates image data of the observational data of the one or more objects in orbit.

3. The computer-implemented method of claim 2, further comprising:
analyzing, using image recognition, the image data of the observational data of the first object in orbit;
identifying, based on the analyzing, that the first object of the one or more objects has collided with a second object of the one or more objects; and
determining, based on the identifying, that the first object is space debris.

4. The computer-implemented method of claim 1, further comprising:
calculating, based on the analysis of the observational data, a time length value for a loss of communication data received from the first object, wherein the first object is a second satellite;
comparing the time length value to a predetermined time threshold; and
determining, based on the predetermined time threshold being met, that the second satellite is space debris.

5. The computer-implemented method of claim 1, further comprising:
identifying, based on the analyzed observational data, the owner of the first object, wherein the first object is space debris; and determining, using one or more smart contracts, a degree of impact caused by the first object, wherein the degree of impact is attributed to the identified owner of the first object.

6. The computer-implemented method of claim 5, wherein determining, using the one or more smart contracts, the degree of impact caused by the first object comprises:
calculating, using a first smart contract rule, a first cost of ownership of the first object, wherein the first cost of ownership is based on a set of impact attributes associated with the first object;
collecting the first object;
determining, based on the analysis of the collected first object, a reuse percentage of the collected first object;
calculating, using a second smart contract rule, a second cost ownership of the first object using the reuse percentage, wherein the degree of impact is based on a difference between the first cost of ownership and the second cost of ownership; and
executing a financial transaction based on the degree of impact caused by the first object.

7. The computer-implemented method of claim 6, wherein the set of impact attributes are selected from the group consisting of:
determined cost related to an impact of the first object with one or more satellites;
dimensions of the first object;
orbital path of the first object in relation to one or more orbital paths of the one or more satellites; and
collection costs related to the first object.

8. The computer-implemented method of claim 1, further comprising identifying the owner of the first object, the owner being identified using image recognition to identify one or more unique identifiers on the first object that indicate ownership of the first object.

9. A system comprising:
a processor; and
a non-transitory computer-readable storage medium communicatively coupled to the processor and storing program instructions which, when executed by the processor, cause the processor to perform a method comprising:
receiving data from a data stream of one or more satellites, wherein the data comprises observational data of one or more objects in orbit;
determining, based on an analysis of the observational data, that a first satellite of the one or more satellites has changed from a first orbital path to a second orbital path to avoid colliding with a first object of the one or more objects in orbit; and
calculating a cost value for the first satellite changing from the first orbital path to the second orbital path, wherein the cost value is applied to a total cost of ownership for an owner of the first object and is based on a cost evaluation of a disruption of service associated with the first satellite.

10. The system of claim 9, wherein the one or more satellites comprise a plurality of satellites that are communicatively connected, and wherein each satellite of the plurality of satellites includes a camera that generates image data of the observational data of the one or more objects in orbit.

11. The system of claim 10, wherein the method further comprises:
analyzing, using image recognition, the image data of the observational data of the first object in orbit;

identifying, based on the analyzing, that the first object of the one or more objects has collided with a second object of the one or more objects; and determining, based on the identifying, that the first object is space debris.

12. The system of claim 9, wherein the method further comprises:

calculating, based on the analysis of the observational data, a time length value for a loss of communication data received from the first object, wherein the first object is a second satellite;

comparing the time length value to a predetermined time threshold; and determining, based on the predetermined time threshold being met, that the second satellite is space debris.

13. The system of claim 9, wherein the method further comprises:

identifying, based on the analyzed observational data, the owner of the first object, wherein the first object is space debris; and determining, using one or more smart contracts, a degree of impact caused by the first object, wherein the degree of impact is attributed to the identified owner of the first object.

14. The system of claim 13, wherein determining, using the one or more smart contracts, the degree of impact caused by the first object comprises:

calculating, using a first smart contract rule, a first cost of ownership of the first object, wherein the first cost of ownership is based on a set of impact attributes associated with the first object;

collecting the first object;

determining, based on the analysis of the collected first object, a reuse percentage of the collected first object;

calculating, using a second smart contract rule, a second cost ownership of the first object using the reuse percentage, wherein the degree of impact is based on a difference between the first cost of ownership and the second cost of ownership; and executing a financial transaction based on the degree of impact caused by the first object.

15. The system of claim 14, wherein the set of impact attributes are selected from the group consisting of:

determined cost related to an impact of the first object with one or more satellites;

dimensions of the first object;

orbital path of the first object in relation to one or more orbital paths of the one or more satellites; and collection costs related to the first object.

16. The system of claim 9, wherein the method further comprises identifying the owner of the first object, the owner being identified using image recognition to identify one or more unique identifiers on the first object that indicate ownership of the first object.

17. A computer program product comprising a non-transitory computer-readable storage medium having program instructions embodied therewith, the program instructions executable by a processor to cause the processor to perform a method comprising:

receiving data from a data stream of one or more satellites, wherein the data comprises observational data of one or more objects in orbit;

determining, based on an analysis of the observational data, that a first satellite of the one or more satellites has changed from a first orbital path to a second orbital path to avoid colliding with a first object of the one or more objects in orbit; and calculating a cost value for the first satellite changing from the first orbital path to the second orbital path, wherein the cost value is applied to a total cost of ownership for an owner of the first object and is based on a cost evaluation of a disruption of service associated with the first satellite.

18. The computer program product of claim 17, wherein the one or more satellites comprise a plurality of satellites that are communicatively connected, and wherein each satellite of the plurality of satellites includes a camera that generates image data of the observational data of the one or more objects in orbit.

19. The computer program product of claim 18, wherein the method further comprises:

analyzing, using image recognition, the image data of the observational data of the first object in orbit;

identifying, based on the analyzing, that the first object of the one or more objects has collided with a second object of the one or more objects; and determining, based on the identifying, that the first object is space debris.

20. The computer program product of claim 17, wherein the method further comprises:

calculating, based on the analysis of the observational data, a time length value for a loss of communication data received from the first object, wherein the first object is a second satellite;

comparing the time length value to a predetermined time threshold; and determining, based on the predetermined time threshold being met, that the second satellite is space debris.

* * * * *